F. P. J. GRENET.
FILTER.
APPLICATION FILED JULY 26, 1911.
1,057,823.
Patented Apr. 1, 1913.
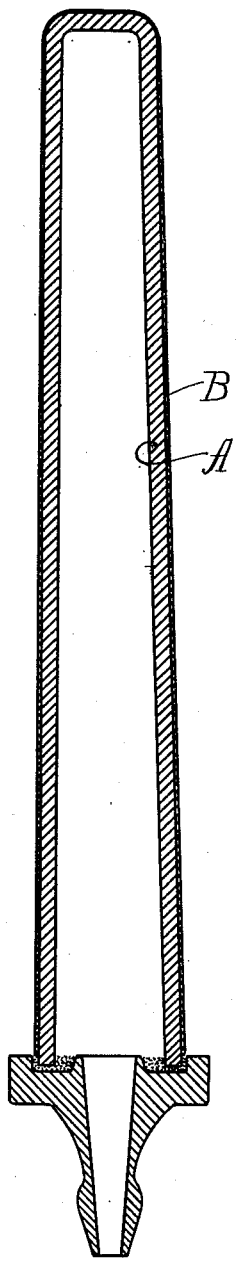

UNITED STATES PATENT OFFICE.

FRANCISQUE PIERRE JACQUES GRENET, OF BELLEVUE, FRANCE, ASSIGNOR TO SOCIÉTÉ ANONYME DU FILTRE CHAMBERLAND SYSTEME PASTEUR, OF PARIS, FRANCE.

FILTER.

1,057,823.   Specification of Letters Patent.   Patented Apr. 1, 1913.

Application filed July 26, 1911. Serial No. 640,813.

*To all whom it may concern:*

Be it known that I, FRANCISQUE PIERRE JACQUES GRENET, a citizen of the Republic of France, residing in Bellevue, Seine-et-Oise, France, have invented certain new and useful Improvements in Filters, of which the following is a specification.

This invention relates to filters and filtering apparatus and has for its object to provide improved means for rendering the filtering substance employed in apparatus of this description more efficient in operation and less liable to become defective owing to long and continual use.

The filtering substance hitherto employed, whether composed of porcelain, infusorial earth, asbestos, charcoal, cellulose or other material, after being in use for a certain length of time, is open to the disadvantage that the continual passage of the liquid not only leaves a deposit upon the surface of the substance, but the particles of impure matter which it is desired to remove, penetrate below the surface of the substance, filling up the pores of the substance and thus rendering it less efficient. Although it is possible to temporarily improve the operation of the filter by wiping or otherwise cleaning the surface of the filtering substance, the cleansing process in many cases further reduces the efficiency of the filter by increasing the density of the obstructions below the surface of the substance.

According to this invention the above disadvantages are overcome by forming on the surface of the filtering substance a protecting covering which is in itself capable of operating as a filtering medium and permits of ready cleansing either superficially or otherwise, so that the properties of the filtering substance are maintained for an indefinite period of time.

As is well known collodion obtained by dissolution of nitro-cellulose in a mixture of alcohol and ether or in acetone or other suitable liquid is up to a certain thickness permeable to liquids and it is this substance which is preferably employed in carrying this invention into practice. As, however, collodion is not in itself capable of resisting a high degree of pressure, it is applied in a coating of suitable thickness to the filtering mantle or substance constituting the filtering medium, thus forming a structure capable of resisting the pressure encountered without danger of deterioration.

The coating of collodion adhering to the filtering medium can readily be cleansed superficially, which, in view of the fact that the particles do not penetrate below the surface of the coating is sufficient to retain all the original properties of the filtering medium. Moreover, owing to the small size and uniformity of the pores of the collodion coating, the passage of the most minute microbes through the filter is prevented and its efficiency correspondingly increased.

Experiments have shown that collodion exposed to the air at ordinary temperatures, dries up and loses its filtering properties and that when a certain degree of dryness has been reached, the film or coating of collodion cracks and subsequently peels off from the body to which it has been attached. It is therefore necessary to avoid deterioration in the filtering property of the collodion to maintain it in a more or less moist condition, which will prevent it from cracking and peeling off from the surface to which it has been applied.

The filtering mantle or substance is preferably coated with collodion by immersing the body in a collodion bath or otherwise covering it with collodion of a suitable thickness and subsequently immersing the filtering body thus coated in a bath of diluted alcohol and then in water. To prevent desiccation of the collodion it is necessary that it should be brought to a permanently hygrometric state and for this purpose the filtering body is immersed in a bath of glycerin and water, or of honey or other suitable substance.

A film of collodion possessing filtering properties can also be obtained by incorporating with the collodion a substance such as glucose, gelatin, tannin and other saline, mineral or organic substance, which are soluble in alcohol, ether and water. The filtering medium thus constituted may be rendered sterile by the inclusion of a suitable antiseptic, such for instance as formol, in the bath in which the filtering mantle or other filtering bodies are immersed.

The filtering mantles or substances covered with the coating of collodion, and reduced to a hygrometric state in the manner set out above keep their filtering capacity for a considerable time, not being in use; but when such a course is rendered desirable, the filtering medium may be removed and placed under a jet of water, or it may be cleansed by means of a pad of medicated cotton wool or other antiseptic passed lightly over the surface.

A filter-mantle embodying the present invention, is shown in the accompanying drawing.

A represents the porous body and B the coating or film of collodion applied thereto. It is obvious, however, that the invention may find expression in a variety of constructional forms.

Having now particularly described and ascertained the nature of my said invention and in what manner the same is to be performed, I declare that what I claim is:

1. A filter comprising a solid filtering medium covered with a coating of collodion, which is filtering.

2. A filter comprising a film of collodion adapted to pass liquid therethrough.

3. A filter comprising a film of collodion adapted to pass liquid therethrough and a support for said film.

4. A filter comprising a porous body covered with a coating of collodion rendered hygrometric after the coating has been applied.

5. The process of manufacturing filtering mediums comprising immersing a solid filtering body in normal collodion and then in a bath of diluted alcohol, and in water.

6. The process of manufacturing filtering mediums comprising immersing a solid filtering body in normal collodion, in which is incorporated glucose, gelatin, tannin or other saline, mineral or organic substance, soluble in alcohol, ether and water.

7. The process of manufacturing filtering apparatus comprising depositing a coating of collodion upon a solid filter structure and subsequently rendering it hygrometric by immersing the solid filtering structure in a bath of glycerin and water.

8. The process of manufacturing filtering apparatus comprising depositing a coating of collodion upon a solid filter structure and subsequently rendering it hygrometric by immersing the solid filtering structure in a bath of glycérin and water with the addition of an antiseptic.

9. The process of manufacturing filtering mediums comprising depositing a coating of collodion upon a filtering substance or structure, and subsequently rendering the coating hygrometric, substantially as described.

10. Filtering apparatus comprising a solid structure provided with an adhesive coating of collodion, substantially as and for the purpose specified.

In witness whereof, I have hereunto signed my name in the presence of two subscribing witnesses.

FRANCISQUE PIERRE JACQUES GRENET.

Witnesses:
H. C. COXE,
RENÉ BARDY.